United States Patent
Karazoun

(10) Patent No.: US 11,871,090 B2
(45) Date of Patent: *Jan. 9, 2024

(54) CLIENT IDENTIFIER WATERMARKS IN MEDIA SIGNALS

(71) Applicant: The Nielsen Company (US), LLC, New York, NY (US)

(72) Inventor: Khaldun Karazoun, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/860,876

(22) Filed: Jul. 8, 2022

(65) Prior Publication Data
US 2022/0345791 A1     Oct. 27, 2022

Related U.S. Application Data

(63) Continuation of application No. 16/883,771, filed on May 26, 2020, now Pat. No. 11,388,486.

(51) Int. Cl.
   *H04N 21/8358*  (2011.01)
   *G06F 21/10*    (2013.01)
   (Continued)

(52) U.S. Cl.
   CPC ......... *H04N 21/8358* (2013.01); *G06F 21/10* (2013.01); *G06F 21/16* (2013.01); *G10L 19/018* (2013.01); *H04N 1/32144* (2013.01); *H04N 21/23418* (2013.01); *H04N 21/23892* (2013.01); *H04N 21/2407* (2013.01); *H04N 21/25808* (2013.01); *H04N 21/2668* (2013.01); (Continued)

(58) Field of Classification Search
   CPC ........... H04N 21/8358; H04N 1/32144; H04N 21/23892; H04N 21/23418; H04N 21/2407; H04N 21/25808; H04N 21/2668; H04N 21/42203; H04N 21/44204; H04N 21/812; H04N 21/4126; H04N 21/4394; G06F 21/10; G06F 21/16; G10L 19/018
   See application file for complete search history.

(56) References Cited

U.S. PATENT DOCUMENTS

2008/0263359 A1* 10/2008 Radzishevsky .... H04N 1/32304
                                                    713/176
2010/0226525 A1   9/2010 Levy et al.
(Continued)

OTHER PUBLICATIONS

"Critical Band Encoding Technology Audio Encoding System From Arbitron," Arbitron Inc., Feb. 2008, 27 pages.

International Searching Authority, "International Search Report and Written Opinion," issued in connection with International Patent Application No. PCT/US2021/034074, dated Sep. 10, 2021, 7 pages.

(Continued)

*Primary Examiner* — Asghar H Bilgrami

(57) ABSTRACT

Client identifier watermarks in media signals are disclosed. An example apparatus to watermark a multilayered file includes a watermark storage to store media identifiers. The example apparatus also includes an encoder to encode a first bit sequence in the media file on a first encoding layer of a multilayered watermark, the first bit sequence to include a client identifier of a client associated with the media file, and encode a second bit sequence in the media file on a second encoding layer of the multilayered watermark, the second bit sequence to include a media identifier to identify media corresponding to the media file.

20 Claims, 8 Drawing Sheets

(51) Int. Cl.
*G06F 21/16* (2013.01)
*G10L 19/018* (2013.01)
*H04N 1/32* (2006.01)
*H04N 21/234* (2011.01)
*H04N 21/2389* (2011.01)
*H04N 21/24* (2011.01)
*H04N 21/258* (2011.01)
*H04N 21/2668* (2011.01)
*H04N 21/41* (2011.01)
*H04N 21/422* (2011.01)
*H04N 21/439* (2011.01)
*H04N 21/442* (2011.01)
*H04N 21/81* (2011.01)

(52) U.S. Cl.
CPC ... *H04N 21/4126* (2013.01); *H04N 21/42203* (2013.01); *H04N 21/4394* (2013.01); *H04N 21/44204* (2013.01); *H04N 21/812* (2013.01)

(56) References Cited

U.S. PATENT DOCUMENTS

| | | |
|---|---|---|
| 2013/0275600 A1 | 10/2013 | Marshall et al. |
| 2016/0026827 A1* | 1/2016 | Ko ..................... G06F 21/6209 |
| | | 713/193 |
| 2017/0334234 A1 | 11/2017 | Curtis |
| 2018/0184160 A1 | 6/2018 | Cain et al. |
| 2018/0342038 A1* | 11/2018 | Majoros ............. H04N 1/32267 |
| 2019/0222554 A1 | 7/2019 | Winograd et al. |
| 2021/0360300 A1* | 11/2021 | Fujimura ........... H04N 21/4318 |
| 2021/0377626 A1 | 12/2021 | Karazoun |

OTHER PUBLICATIONS

United States Patent and Trademark Office, "Notice of Allowance and Fee(s) Due," issued in connection with U.S. Appl. No. 16/883,771, dated Mar. 11, 2022, 8 pages.

* cited by examiner

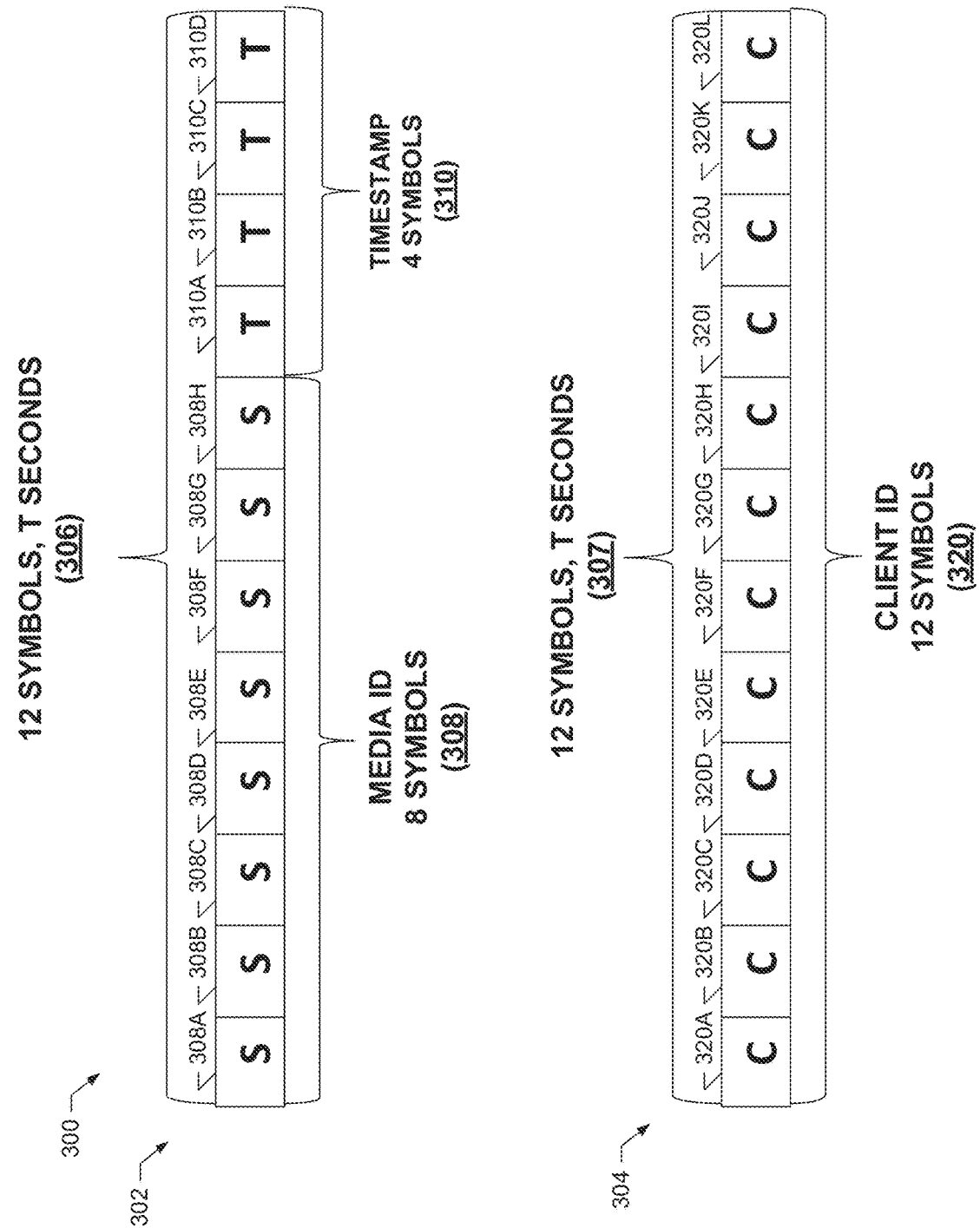

CLIENT IDENTIFIER WATERMARKS IN MEDIA SIGNALS

RELATED APPLICATION

This patent arises from a continuation of U.S. patent application Ser. No. 16/883,771, which was filed on May 26, 2020. U.S. patent application Ser. No. 16/883,771 is hereby incorporated herein by reference in its entirety. Priority to U.S. patent application Ser. No. 16/883,771 is hereby claimed.

FIELD OF THE DISCLOSURE

This disclosure relates generally to media watermarking and, more particularly, to client identifier watermarks in media signals.

BACKGROUND

Watermarks can be embedded or otherwise included in media to enable additional information to be conveyed with the media. For example, audio watermarks can be embedded and/or included in the audio data/signal portion of a media stream, file and/or signal to convey data, such as media identification information, copyright protection information, etc., associated with the media. These watermarks enable monitoring of the distribution and/or use of media, such as by detecting watermarks present in television broadcasts, radio broadcasts, streamed multimedia, etc., to identify the particular media being presented to viewers, listeners, users, etc. The information can be valuable to advertisers, content providers, and the like.

BRIEF DESCRIPTION OF THE DRAWINGS

FIGS. 3A-3C illustrates example watermarks that can be implemented in examples disclosed herein.

Figure 1:
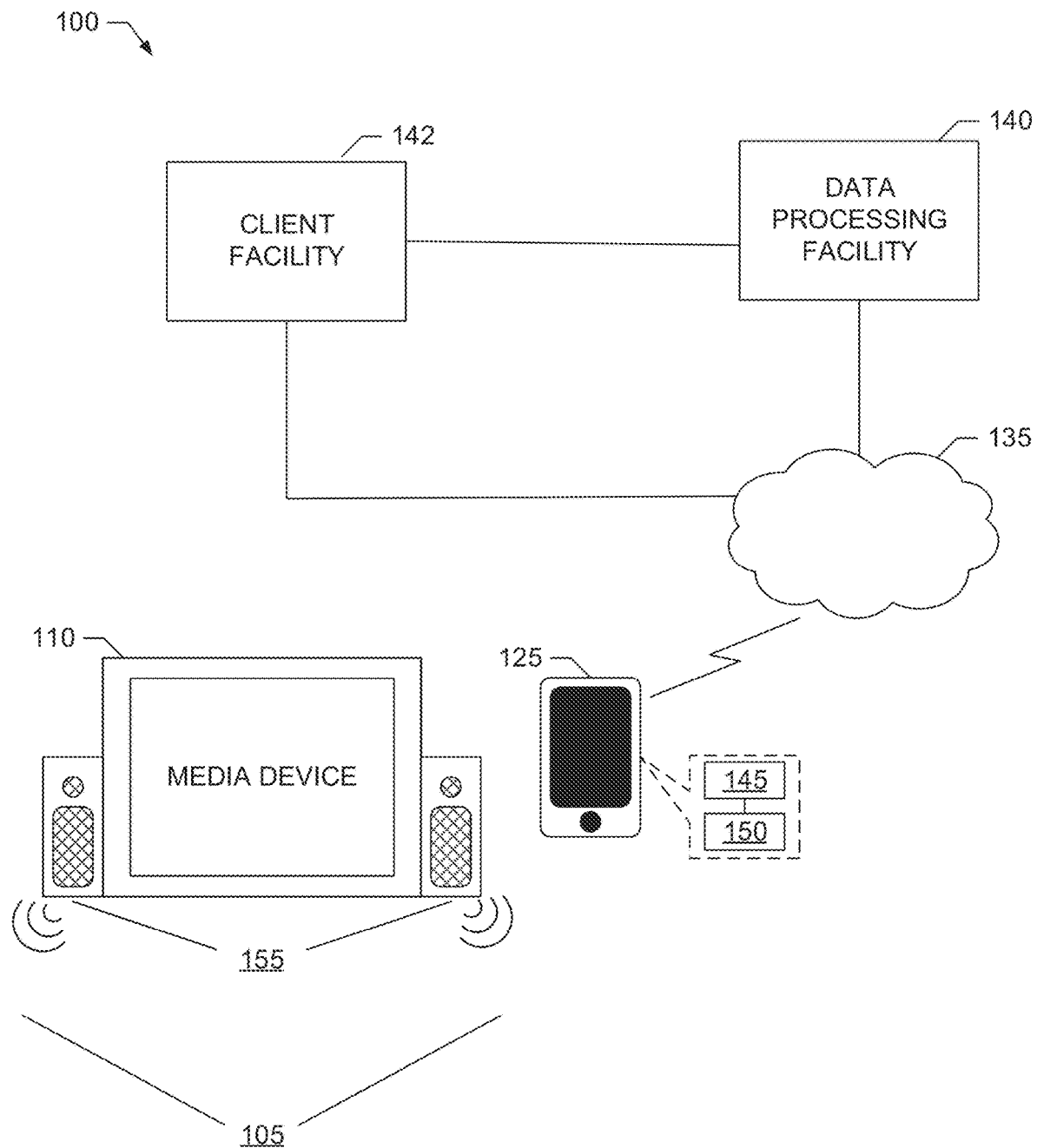
FIG. 1 is a block diagram of an example media monitoring system in accordance with the teachings of this disclosure.

The figures are not to scale. In general, the same reference numbers will be used throughout the drawing(s) and accompanying written description to refer to the same or like parts. Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Client identifier watermarks in media signals are disclosed. Watermarks can be embedded or otherwise included in media to enable additional information to be conveyed with the media. The watermarks enable monitoring of the distribution and/or use of media by identifying the particular media being presented to viewers, listeners, users, etc. The information can be valuable to advertisers, content providers, and the like. Some known media monitoring systems employing watermarks typically include watermark encoders that encode watermarks that are unique for individual media content files. However, depending on the encoding methodology employed, the number of available identifiers can be limited, especially across different media content providers and/or distributors.

Some watermark encoding techniques are described in U.S. patent application Ser. No. 13/955,245 (U.S. Pat. No. 9,711,152), entitled SYSTEMS, APPARATUS AND METHODS FOR ENCODING/DECODING PERSISTENT UNIVERSAL MEDIA CODES TO ENCODED AUDIO, U.S. patent application Ser. No. 13/955,438 (U.S. Publication No. 2015/0039321), entitled APPARATUS, SYSTEM AND METHOD FOR READING CODES FROM DIGITAL AUDIO ON A PROCESSING DEVICE, U.S. patent application Ser. No. 14/023,221 (U.S. Publication No. 2015/0039322), entitled APPARATUS, SYSTEM AND METHOD FOR MERGING CODE LAYERS FOR AUDIO ENCODING AND DECODING, and U.S. patent application Ser. No. 14/587,995 (U.S. Pat. No. 9,418,395), entitled POWER EFFICIENT DETECTION OF WATERMARKS IN MEDIA SIGNALS. Some other watermarking techniques are described in U.S. patent application Ser. No. 15/994,383 (U.S. Publication No. 2019/0373309), entitled METHODS AND APPARATUS TO IDENTIFY MEDIA BASED ON WATERMARKS ACROSS DIFFERENT AUDIO STREAMS AND/OR DIFFERENT WATERMARKING TECHNIQUES.

Examples disclosed herein enable watermarks with identifiers that are associated with and/or assigned to a specific client in contrast to identifiers (i.e., universal identifiers) utilized for multiple clients. Examples disclosed herein utilize assigned client identifiers (e.g., media content producer identifiers, media content distributor identifiers, etc.) with associated media identifiers (e.g., content identifiers, media identifier time stamps, media source identifiers, etc.), thereby enabling creation of a relatively large number of unique identifiers. In some examples, a first bit sequence corresponding to a client identifier is defined (e.g., encoded) onto a first encoding layer of a multilayered watermark applied to a media file. Further, a second bit sequence pertaining to a content identifier is defined (e.g., encoded) onto a second encoding layer of the multilayered watermark. Accordingly, by identifying clients within the multilayered watermark, examples disclosed herein enable a relatively large number of identifiers.

In some examples, the aforementioned media identifiers are received at a data processing facility from a client facility (e.g., a client facility for a content provider/generator). In some such examples, the media identifiers are generated, assigned and/or distributed by the client facility. In some examples, a digital file, such as an audio file, is watermarked with the first and second bit sequences on different respective audio watermarking layers. In some examples, the media identifier includes a time stamp and/or timestamp information. Additionally or alternatively, the time stamp is encoded onto at least one of the first or second encoding layers.

Turning to the figures, a block diagram of an example media monitoring system 100 is illustrated in FIG. 1. The example media monitoring system 100 supports monitoring of media presented at one or more monitored sites, such as an example monitored site 105 illustrated in FIG. 1. The monitored site 105 includes an example media device (e.g., a media presentation device) 110. Although the example of FIG. 1 illustrates one monitored site 105 and one media device 110, examples disclosed herein can be implemented in media monitoring systems 100 supporting any number of monitored sites 105 having any number of media devices 110.

The media monitoring system 100 of the illustrated example includes an example media device meter 125, also referred to as a meter 125, a site meter 125, a site unit 125, a home unit 125, a portable device 125, etc., to monitor media presented by the media device 110. In the illustrated example, the media monitored by the media device meter 125 can correspond to any type of media presentable by the media device 110. For example, monitored media can correspond to media content, such a television programs, radio programs, movies, Internet video, video-on-demand, etc., as well as commercials, advertisements, etc. In this example, the media device meter 125 determines metering data that may identify and/or be used to identify media presented by the media device (and, thus, infer media exposure) at the monitored site 105. The media device meter 125 then stores and reports this metering data via an example network 135 to an example data processing facility 140. In this example, the data processing facility 140 performs any appropriate post-processing of the metering data to, for example, determine audience ratings information, identify targeted advertising to be provided to the monitored site 105, etc. In the illustrated example, the network 135 can correspond to any type(s) and/or number of wired and/or wireless data networks, or any combination thereof.

In the illustrated example, the media device 110 monitored by the media device meter 125 can correspond to any type of audio, video and/or multimedia presentation device capable of presenting media audibly and/or visually. For example, the media device 110 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. As other examples, the media device 110 can correspond to a multimedia computer system, a personal digital assistant, a cellular/mobile smartphone, a radio, a tablet computer, etc.

In the media monitoring system 100 of the illustrated example, the media device meter 125 and the data processing facility 140 cooperate to perform media monitoring based on detecting media watermarks. Examples of watermarks include identification codes, ancillary codes, etc., that may be transmitted within media signals. For example, identification codes can be transmitted as watermarked data embedded or otherwise included with media (e.g., inserted into the audio, video, or metadata stream of media) to uniquely identify broadcasters and/or media (e.g., content or advertisements). Watermarks can additionally or alternatively be used to carry other types of data, such as copyright protection information, secondary data (e.g., such as one or more hyperlinks pointing to secondary media retrievable via the Internet and associated with the primary media carrying the watermark), commands to control one or more devices, etc. Watermarks are typically extracted using a decoding operation. Examples disclosed herein utilize watermarks that identify media information, as well as client identity information.

In contrast to watermarks, signatures are a representation of some characteristic of the media signal (e.g., a characteristic of the frequency spectrum of the signal). Signatures can be thought of as fingerprints. They are typically not dependent upon insertion of data in the media, but instead preferably reflect an inherent characteristic of the media and/or the signal transporting the media. Systems to utilize codes and/or signatures for audience measurement are long known. See, for example, U.S. Pat. No. 5,481,294 to Thomas et al., which is hereby incorporated by reference in its entirety.

In the illustrated example of FIG. 1, the media device meter 125 is implemented by a portable device including an example watermark detector 145 and an example watermark detector controller 150. In the illustrated example, the watermark detector 145 detects watermark(s) in media signal(s) output from a monitored media device, such as the example media device 110. In the illustrated example, the watermark detector controller 150 controls operation of the watermark detector 145. In some examples, the media device meter 125 corresponds to a special purpose portable device constructed to implement the example watermark detector 145 and the example watermark detector controller 150. In other examples, the media device meter 125 corresponds to any portable device capable of being adapted (e.g., via hardware changes, software changes, firmware changes, etc., or any combination thereof) to implement the example watermark detector 145 and the example watermark detector controller 150. As such, the media device meter 125 can be implemented by a smartphone, a tablet computer, a handheld device, a wrist-watch type device, other wearable devices, a special purpose device, etc. In some examples, the media device meter 125 can be implemented by a portable device that, although portable, is intended to be relatively stationary. Furthermore, in some examples, the media device meter 125 can be implemented by or otherwise included in the media device 110, such as when the media device 110 corresponds to a portable device (e.g., a smartphone, a tablet computer, a handheld device, etc.) capable of presenting media. This implementation can be especially useful in example scenarios in which a media monitoring application is executed on the media device 110 itself, but the media device 110 prevents (e.g., via digital rights management or other techniques) third-party applications, such as the media monitoring application, from accessing protected media data stored on the media device 110.

In some examples, the client facility 142 is implemented to assign and/or designate the watermarks for encoding and/or de-coding by the data processing facility 140. For example, the watermarks can be generated and encoded onto the media at the client facility 142. The client facility 142 can correspond to a content generator, distributor and/or producer. In some examples, the client facility 142 assigns the watermarks to content for later identification by the data processing facility 140. In some such examples, the client facility 142 transmits the watermarks to the data processing facility 140 for identification based on data received from the media device meter 125.

Figure 2:
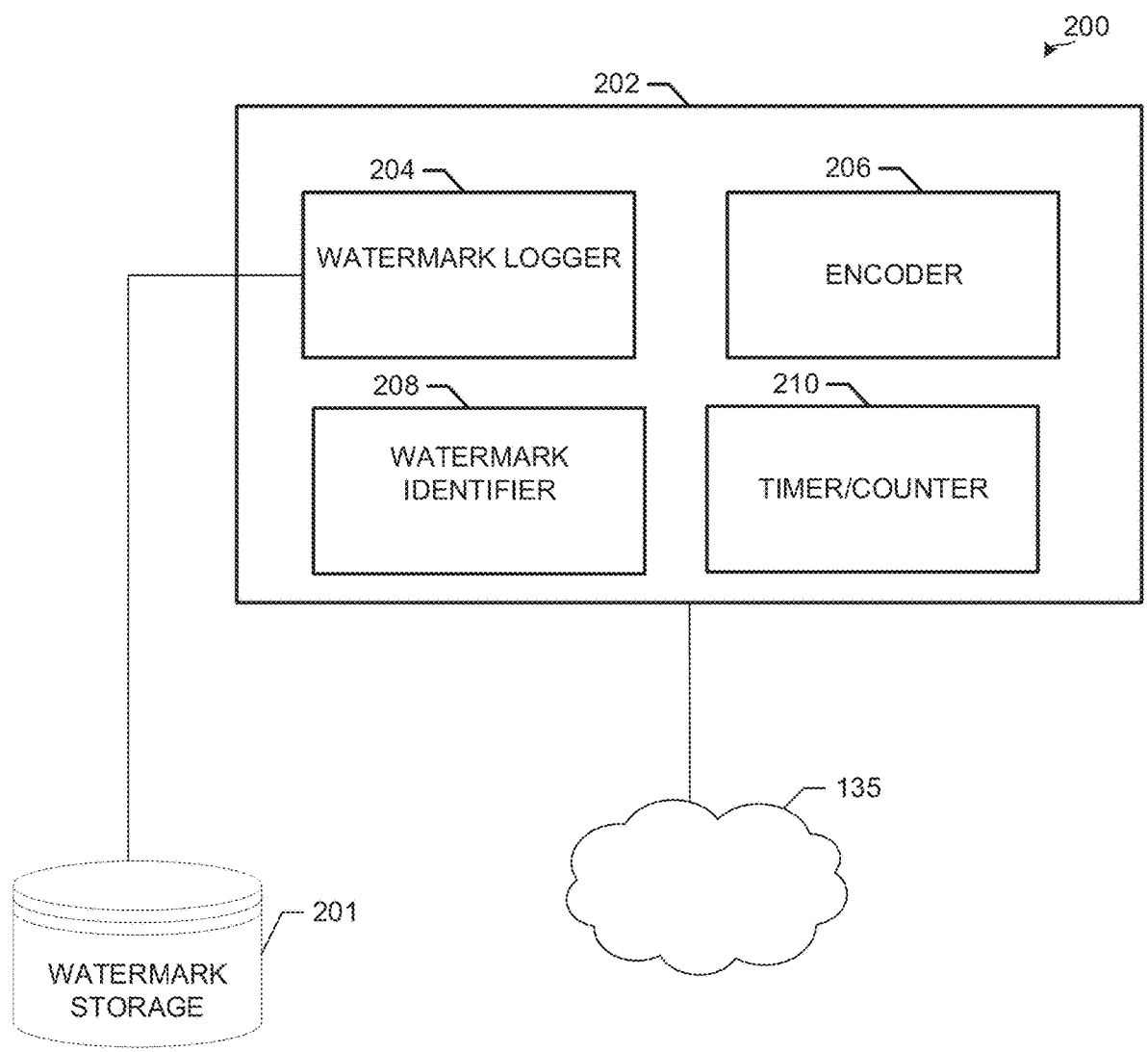
FIG. 2 is a schematic overview of an example implementation of an example watermark system that can be implemented in examples disclosed herein.

FIG. 2 is a schematic overview of an example watermark system 200 to implement examples disclosed herein. The watermark system 200 of the illustrated example may be implemented in the data processing facility 140, the client facility 142 and/or the media device meter 125 of FIG. 1. The example watermark system 200 includes a watermark analyzer 202, which is communicatively coupled to a watermark storage 201 and the example network 135. In turn, the example watermark analyzer 202 includes a watermark logger 204, an encoder 206, a watermark identifier 208 and a timer/counter 210.

The watermark logger 204 of the illustrated example stores, identifies and/or designates watermarks to be encoded onto a multilayered watermark applied to a media file (e.g., a multilayered watermark applied to an audio file, a multilayered watermark applied to a digital file, a multilayer watermark encoded into a video file, etc.). In some examples, the watermarks are retrieved by the watermark logger 204 from the watermark storage 201, which can include watermarks received from the client facility 142 via the network 135. In some such examples, the client facility 142 of a media content provider provides the watermarks to the watermark storage 201 via the network 135. Particularly, the content provider can generate and produce the content with encoded watermarks and, in turn, provide the watermarks for storage in the watermark storage 201 for later identification by the data processing facility 140.

In the illustrated example, the encoder 206 is implemented to encode bit sequences onto multiple watermarking layers of a multilayered watermark. For example, the example encoder 206 encodes a first bit sequence onto a first watermarking layer (e.g., a first audio watermarking layer) of the multilayered watermark and a second bit sequence onto a second watermarking layer (e.g., a second audio watermarking layer) of the multilayered watermark, as discussed in further detail below in connection with FIGS. 3A-3C. In this example, the first bit sequence corresponds to a client identifier while the second bit sequence corresponds to a media identifier. Further, in this example the first and second bit sequences are placed at regular intervals (e.g., bit number intervals, time intervals, an interval based on a predetermined number of bits, etc.). The first and second bit sequences can be 8-bit, 16-bit, 32-bit, 64-bit, etc. or any other appropriate number of bits. In some examples, the encoder 206 is implemented at the client facility 142.

The example watermark identifier 208 is implemented to decode and/or analyze the watermarks with the aforementioned first and second bit sequences. In the illustrated example, the watermark identifier receives and/or identifies watermark information (e.g., symbols, numbers, etc.) and determines a client along with a corresponding media identifier (e.g., a content identifier with or without a corresponding timestamp) from each of the watermarks. For example, the watermark identifier determines a client and a media identifier along with corresponding timestamp information for specific media content. In some examples, the watermark identifier 208 identifies a client prior to determining a media identifier to enable time and computer processing efficient watermark determinations.

In some examples, the timer/counter 210 determines and/or controls timing and/or sequencing of the first and second bit sequences. In some such examples, the timer/counter 210 determines periodic spacing between bit sequences on one or more layers of the multilayered watermark encoded in the media file. For example, the timer/counter 210 controls periodic spacing between ones of the first and second bit sequences (e.g., the first and second bit sequences are repeated at regular time and/or bit intervals on their respective encoding layers). Additionally or alternatively, the timer/counter 210 varies a timing between ones of the first or second bit sequences based on varying desired metering granularity (e.g., at different portions of the multilayered watermark encoded in the media file), for example.

Figure 3B:
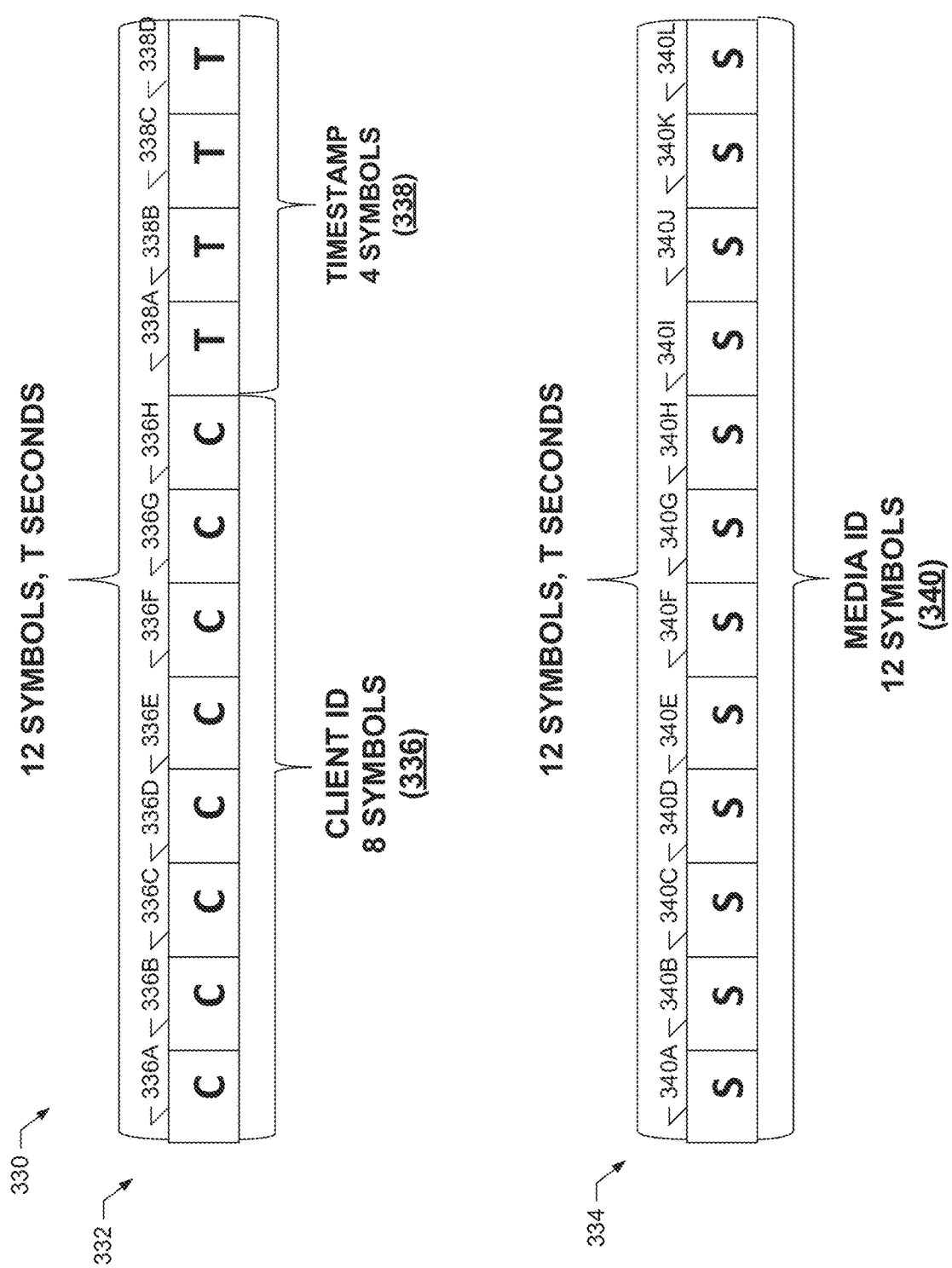
Figure 3C:
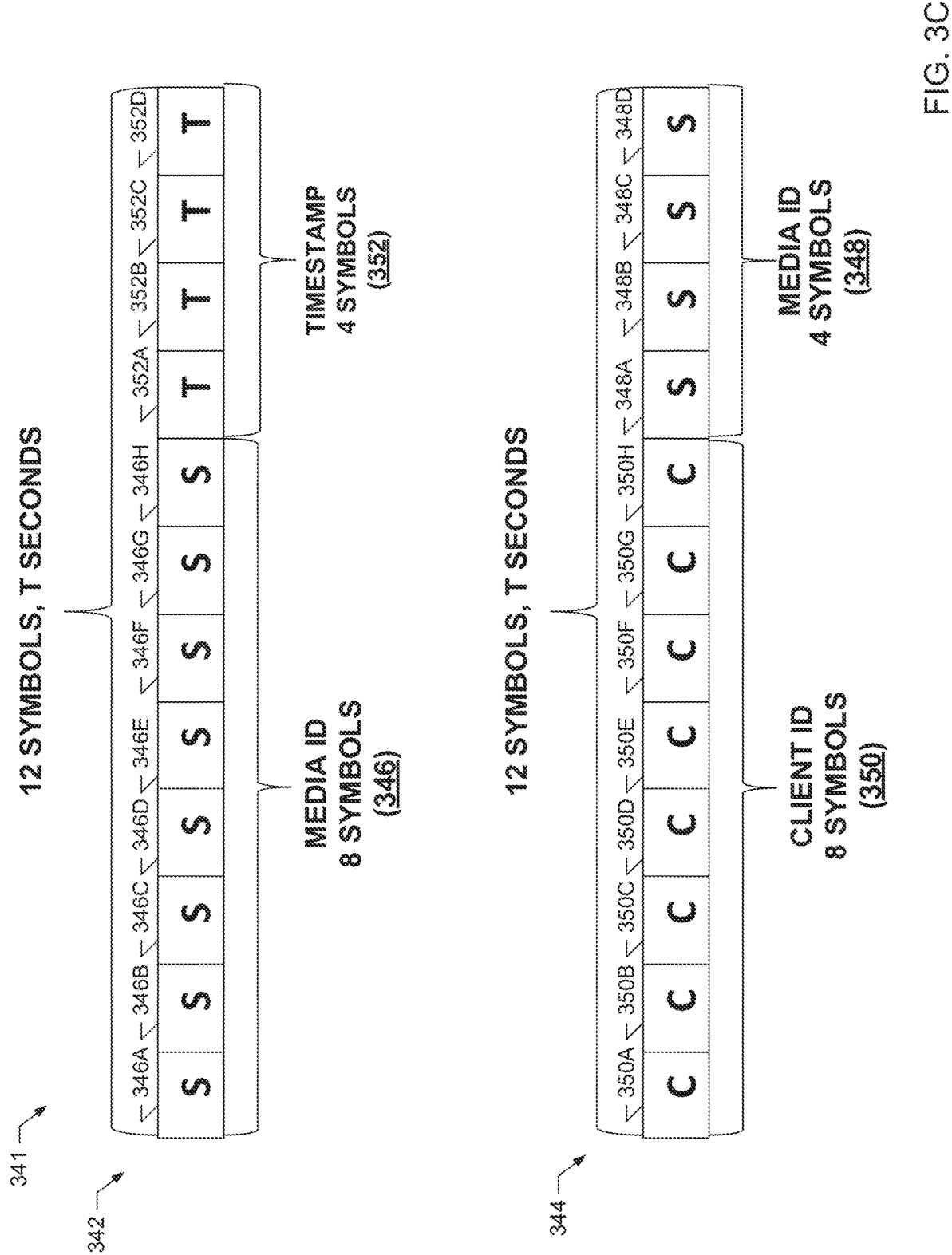

FIGS. 3A-3C illustrate example watermarks that can be implemented in examples disclosed herein. The watermarks can be detected by the example media device monitor 100 of FIG. 1. Turning to FIG. 3A, an example watermark 300 is shown. In this example, the watermark 300 is placed on multiple separate watermark encoding layers (e.g., separate audio watermarking layers) 302, 304. In some examples, a multilayer audio watermark can include multiple audio watermarking layers (also called audio encoding layers) in which different layers use frequency components from different frequency ranges or groups of frequency ranges (e.g., frequency components from different groups of frequency bins) of the audio signal/file to encode watermark symbols in their respective layers. For example, a first audio watermarking layer may use frequency components selected from a first group of frequency bins to encode a first set of watermark symbols in the audio signal/file, and a second audio watermarking layer may use frequency components selected from a second group of frequency bins to encode a second set of watermark symbols in the audio signal/file, with at least some of the frequency bins in the first and second groups being different.

In the illustrated example, the encoding layer 302 includes a bit sequence 306 while the encoding layer 304 includes a bit sequence 307. The bit sequence 306 includes symbols 308 (hereinafter 308A, 308B, 308C, 308D, 308E, 308F, 308G, 308H, etc.) that correspond to a media identifier 208. Further, symbols 310 (hereinafter 310A, 310B, 310C, 310D, etc.) represent a timestamp 212 and the bit sequence 307 includes symbols 320 (hereinafter 320A, 320B, 320C, 320D, 320E, 320F, 320G, 320H, 320I, 320K, 320L, etc.). In this particular example, the client identifier 320 is placed on a different encoding layer from the media identifier 308 and/or the timestamp 312. Further, the first and second bit sequences 306, 307 are located and/or positioned to be simultaneously read and/or parsed out from the media content. In other words, the first and second bit sequences 306, 307 are simultaneously read and/or parsed in parallel by the media device monitor 125.

By including the client identifier 320 on at least one of the encoding layers 302, 304, media identification is not limited to universal numbering (e.g., across multiple media content sources or distributors), thereby enabling a large number of available numbers. In other words, unique media identifiers are, in effect, multiplied. Further, encoding the client identifier 320 onto the content enables media sources and/or providers to define and, thus, manage their own media identifiers, thereby reducing (e.g., eliminating) a need for an external intermediary to manage the media identifiers amongst several content providers.

In this example, the bit sequences 306, 307 each include 12 symbols. However, any appropriate number of symbols and/or bits can be implemented instead. Further, the example bit sequences 306, 307 can be implemented on any appropriate file type including, but not limited to, audio files, video files, encoded transmissions, file downloads, etc. In some examples, a time stamp is integrated with a media identifier so that the media identifier identifies both media content and corresponding time stamp information (e.g., symbols correspond to a timestamp of specific media content).

Turning to FIG. 3B, an alternative example watermark 330 is shown. The watermark 330 is defined on encoding layers 332, 334. In contrast to the example watermark 300 of FIG. 3A, symbols 336 (hereinafter 336A, 336B, 336C, 336D, 336E, 336F, 336G, 336H, etc.) pertaining to a client identifier are placed on the same bit layer 332 as symbols 338 (hereinafter 338A, 338B, 338C, 338D, etc.) corresponding to a timestamp. In the illustrated example, symbols 340 (hereinafter 340A, 340B, 340C, 340D, 340E, 340F, 340G, 340H, 340I, 340J, 340K, 340L, etc.) correspond to a media identifier.

FIG. 3C depicts an alternative example watermark 341 in which at least one of a media identifier, a time stamp and/or a client identifier is defined on multiple encoding layers 342, 344. In the illustrated example of FIG. 3C, the watermark 341 is encoded onto encoding layers 342, 344. In particular, the first encoding layer 342 includes symbols 346 (hereinafter 346A, 346B, 346C, 346D, 346E, 346F, 346G, 346H, etc.) that correspond to a media identifier and the second encoding layer 344 includes symbols 348 (hereinafter 348A, 348B, 348C, 348D, etc.) that also correspond to the media identifier. Accordingly, in some examples, at least portions of the encoding layers 342, 344 can be appended and/or added together to indicate and/or decode the media identifier. In this example, symbols 350 (hereinafter 350A. 350B, 350C, 350D, 350E, 350F, 350G, 350H, etc.) correspond to a client identifier. Further, in this example, symbols 352 (hereinafter 352A. 352B, 352C, 352D, etc.) correspond to a time stamp.

While an example manner of implementing the watermark system 200 of FIG. 2 is illustrated in FIG. 2, one or more of the elements, processes and/or devices illustrated in FIG. 2 may be combined, divided, re-arranged, omitted, eliminated and/or implemented in any other way. Further, the example watermark logger 204, the example encoder 206, the example watermark identifier 208, the example timer/counter 210 and/or, more generally, the example watermark system 200 of FIG. 2 may be implemented by hardware, software, firmware and/or any combination of hardware, software and/or firmware. Thus, for example, any of the example watermark logger 204, the example encoder 206, the example watermark identifier 208, the example timer/counter 210 and/or, more generally, the example watermark system 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example watermark logger 204, the example encoder 206, the example watermark identifier 208, and/or the example timer/counter 210 is/are hereby expressly defined to include a non-transitory computer readable storage device or storage disk such as a memory, a digital versatile disk (DVD), a compact disk (CD), a Blu-ray disk, etc. including the software and/or firmware. Further still, the example watermark system 200 of FIG. 2 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
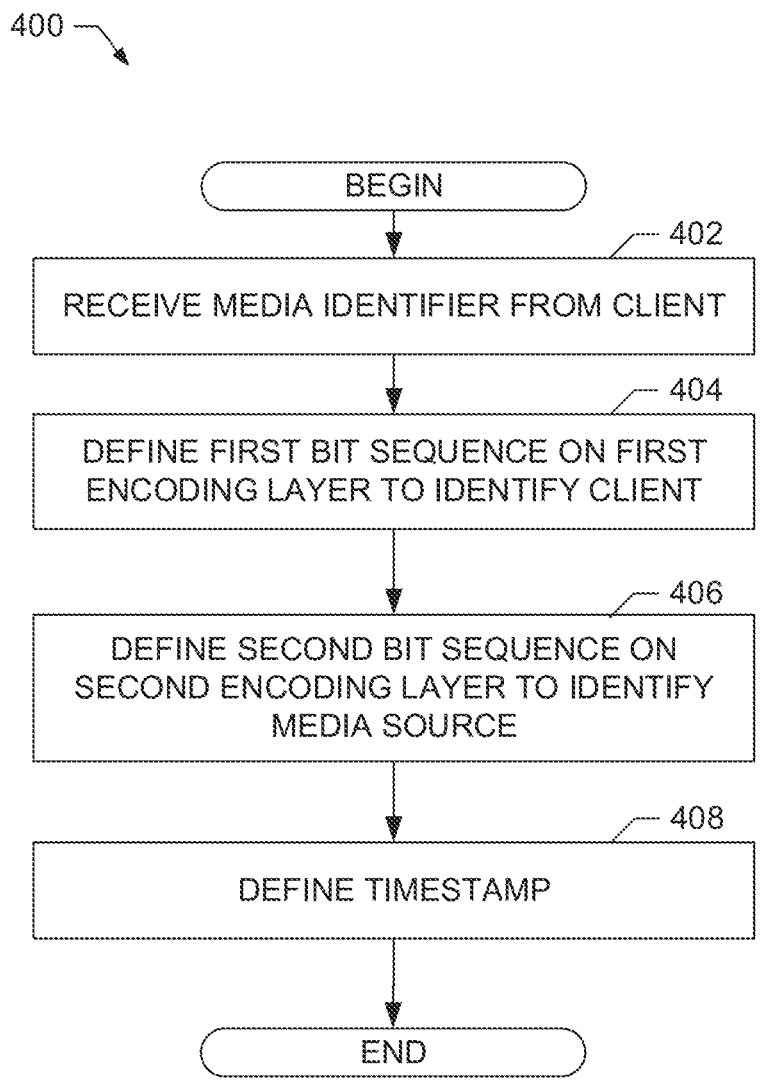
FIG. 4 is a flowchart representative of machine readable instructions which may be executed to implement the example media monitoring system of FIG. 1 and/or the example watermark system of FIG. 2.
Figure 5:
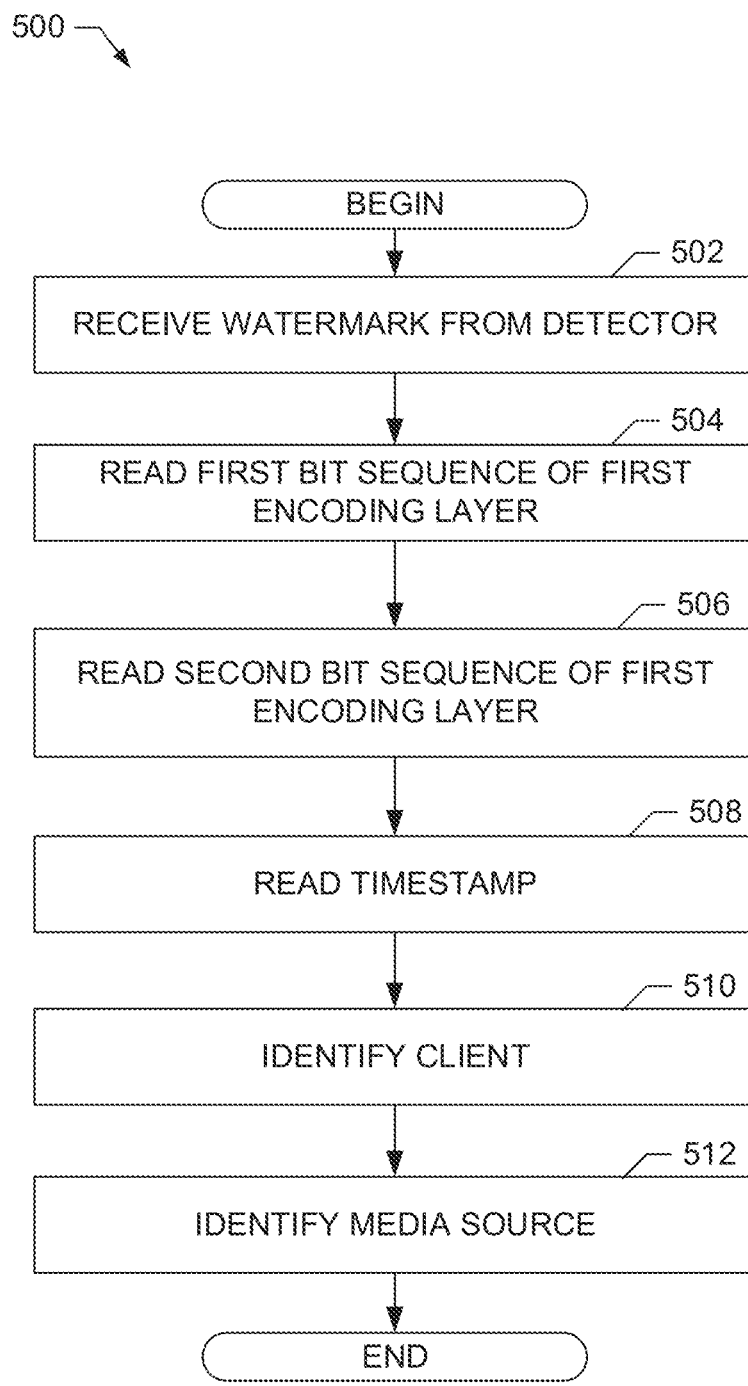
FIG. 5 is a flowchart representative of machine readable instructions which may be executed to implement the example media monitoring system of FIG. 1 and/or the example watermark system of FIG. 2.

Flowcharts representative of example hardware logic, machine readable instructions, hardware implemented state machines, and/or any combination thereof for implementing the watermark system 200 of FIG. 2 are shown in FIGS. 4 and 5. The machine readable instructions may be one or more executable programs or portion(s) of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 4 and 5, many other methods of implementing the example watermark system 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 4 and 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The example method 400 of FIG. 4 begins as the client facility 142 and/or the data processing facility 140 of FIG. 1 is generating media content in the form of a watermarked multilayered encoded file. In the illustrated example, the client facility 142 is defining a watermark with a client identifier that is to be encoded in a multilayered watermark. In some examples, the watermark defines content information (e.g., copyright information, viewing information, etc.), as well as corresponding time stamp information. The time stamp information conveys what specific portions of the media content are being viewed and detected by the media device monitor 125.

In this example, at block 402, the watermark logger 204 receives a media identifier from the client facility 142 via the network 135. In the illustrated example, media content is produced at the client facility 142 and assigned time-stamped media identifiers associated with a known client identifier of the client facility 142. In some examples, the identifiers of the media content are provided with associated content information (e.g., artist, program, title, program title, etc.).

At block 404, the encoder 206 of the illustrated example defines a first bit sequence on a first encoding layer of a multilayered watermark to identify a client. In this example, the first bit sequence corresponds to a client identifier. In some examples, the data processing facility 140 assigns and/or provides different client identifiers to multiple respective clients associated with the data processing facility 140.

At block 406, the example encoder 206 defines a second bit sequence on a second encoding layer of the multilayered watermark to identify a media source and/or content. In this example, the second bit sequence corresponds to a media identifier which can, in turn, include time stamp information. In some examples, a portion of bit sequences of the media identifier, the time stamp and/or the client identifier are placed onto separate encoding layers of the multilayered watermark.

At block 408, in some examples, the timer/counter 210 defines and/or encodes a timestamp onto at least one of the first or second encoding layers and the process ends. In other examples, time stamp information is integrated with the media identifier.

The example method 500 of FIG. 5 begins as the media device monitor 125 provides information pertaining to a watermark to the data processing facility 140. In some examples, the media device monitor 125 decodes and transmits the watermark to the data processing facility 140. Additionally or alternatively, the media device monitor 125 parses out the watermark and transmits the watermark to the data processing facility 140 for subsequent processing thereof.

At block 502, the watermark logger 204 receives the watermark and/or data pertaining to the watermark from a detector, such as the media device monitor 125, for example. In this example, the watermark is received including a first bit sequence (e.g., a first set of symbols) of a first encoding layer of the watermark and a second bit sequence (e.g., a second set of symbols) of a second encoding layer of the watermark.

At block 504, the watermark identifier 208 reads and/or parses the first bit sequence of the first encoding layer. In this example, the first bit sequence corresponds to a client identifier. In some examples, the client identifier enables a search pattern (e.g., via a narrowed search pattern) for the corresponding media content to be identified, thereby conserving computational resources.

At block 506, the watermark detector 208 reads and/or parses the second bit sequence of the second encoding layer. In this example, the second bit sequence corresponds to a media source identifier (e.g., a media identifier and/or a timestamp information associated with media content). In this example, time stamp data is part of the media source identifier.

At block 508, in some examples, the timer/counter 210 reads and/or determines time stamps encoded onto at least one of the first or second encoding layers.

At block 510, the watermark identifier 208 identifies a client from the watermark. In particular, the watermark identifier 208 identifies the client based on the client identifier encoded onto the first encoding layer.

At block 512, the watermark identifier 208 identifies a media source from the watermark and the process ends. In this example, the watermark identifier 208 identifies a portion of the media content with a corresponding timestamp.

Figure 6:
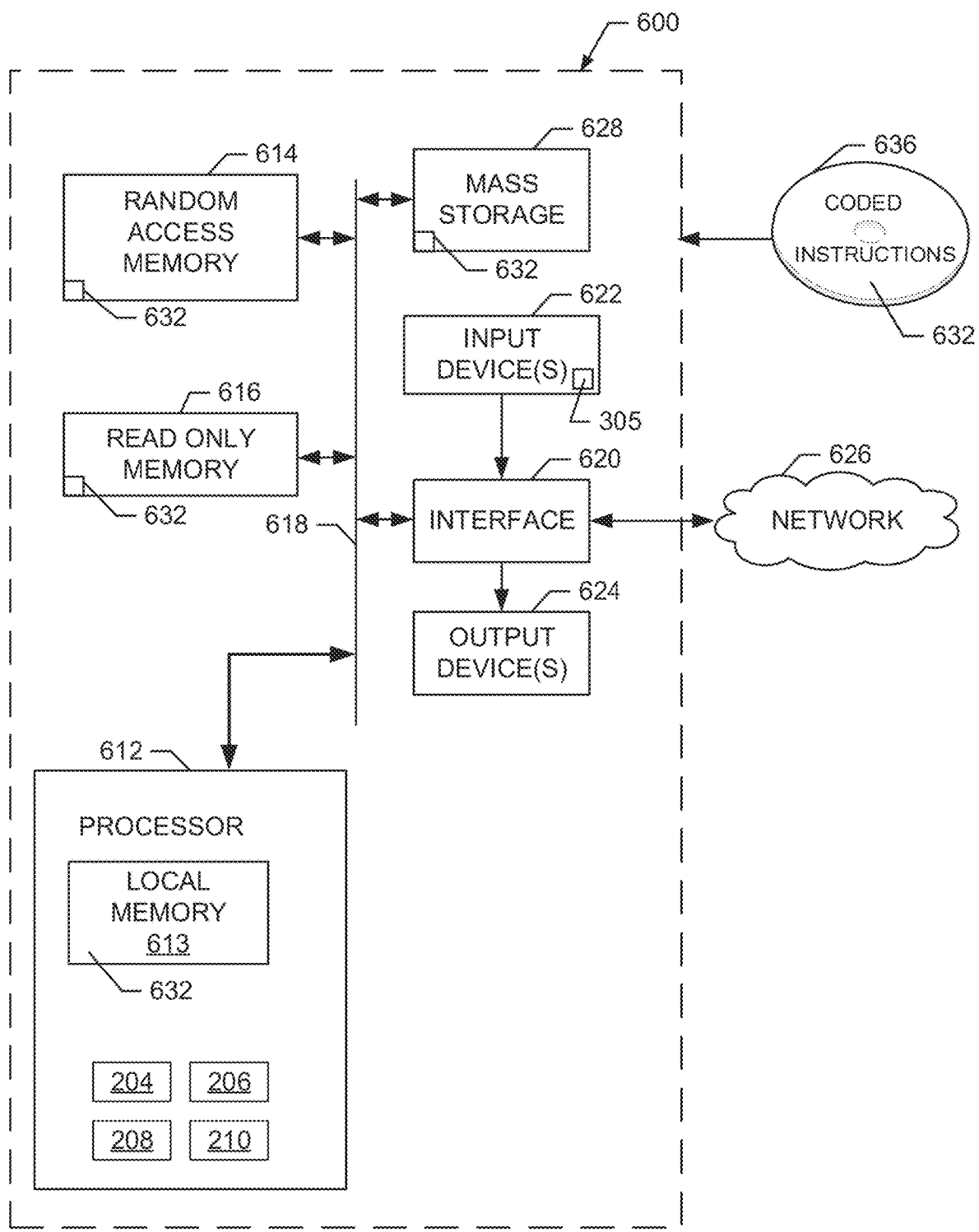
FIG. 6 is a block diagram of an example processing platform structured to execute the instructions of FIGS. 4 and/or 5 to implement the example media monitoring system of FIG. 1 and/or the example watermark system of FIG. 2.

FIG. 6 is a block diagram of an example processor platform 600 structured to execute the instructions of FIGS. 4 and 5 to implement the watermark system 200 of FIG. 2. The processor platform 600 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example watermark logger 204, the example encoder 206, the example watermark identifier 208 and the example timer/counter 210.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 1022 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 4 and 5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that enable time-efficient watermarking of media signals, files, etc. Examples disclosed herein enable media content providers/producers to assign client-assigned watermarks, thereby enabling a significant number of unique watermarks to be used across many of the media content providers/producers. Some examples disclosed herein reduce overhead of data processing facilities by shifting media identifiers to clients (e.g., media producers, media distributors, etc.). The disclosed methods, apparatus and articles of manufacture can improve the efficiency of using a computing device and enable more computationally efficient identification by utilizing more efficient searching of known watermarks based on narrowed search fields pertaining to clients. The disclosed methods, apparatus and articles of manufacture are accordingly directed to one or more improvement(s) in the functioning of a computer.

Example 1 includes an apparatus to watermark a multilayered file includes a watermark storage to store media identifiers. The example apparatus also includes an encoder to encode a first bit sequence in the media file on a first encoding layer of a multilayered watermark, the first bit sequence to include a client identifier of a client associated with the media file, and encode a second bit sequence in the media file on a second encoding layer of the multilayered watermark, the second bit sequence to include a media identifier to identify media corresponding to the media file.

Example 2 includes the apparatus as defined in example 1, further including a transceiver communicatively coupled to a client facility, the transceiver to receive the media identifier from the client facility.

Example 3 includes the apparatus as defined in example 1, where the encoder is to encode a time stamp on at least one of the first encoding layer or the second encoding layer.

Example 4 includes the apparatus as defined in example 1, where the encoder is to encode the first bit sequence and the second bit sequence on the first encoding layer and the second encoding layer, respectively, at periodic intervals.

Example 5 includes the apparatus as defined in example 1, where the media file includes an audio file, and the first encoding layer and the seconding encoding layer corresponding to a first audio encoding layer and a second audio encoding layer, respectively, of the audio file.

Example 6 includes the apparatus as defined in example 1, where at least one of the client identifier or the media identifier is encoded on the first encoding layer and the second encoding layer.

Example 7 includes the apparatus as defined in example 1, further including a watermark identifier to identify at least a portion of the media file by appending the second bit sequence to the first bit sequence.

Example 8 includes a method of watermarking a media file for later identification of at least portions thereof including encoding, by executing instructions with at least one processor, a first bit sequence in the media file on a first encoding layer of a multilayered watermark, the first bit sequence to include a client identifier of a client associated with the media file, and encoding, by executing instructions with the at least one processor, a second bit sequence in the media file on a second encoding layer of the multilayered watermark, the second bit sequence to include a media identifier to identify media corresponding to the media file, Example 9 includes the method as defined in example 8, further including encoding a time stamp on at least one of the first encoding layer or the second encoding layer.

Example 10 includes the method as defined in example 8, where the first bit sequence and the second bit sequence are encoded onto the first encoding layer and the second encoding layer, respectively, at periodic intervals.

Example 11 includes the method as defined in example 8, where the first bit sequence and the second bit sequence are defined onto the first encoding layer and the second encoding layer, respectively, at a predetermined number of bits for the first encoding layer and the second encoding layer.

Example 12 includes the method as defined in example 8, where the media file includes an audio file, and the first encoding layer and the second encoding layer corresponding to a first audio layer and a second audio layer, respectively, of the audio file.

Example 13 includes the method as defined in example 8, further including identifying the media of the media file by appending the second bit sequence to the first bit sequence.

Example 14 includes the method as defined in example 8, where the at least one of the media identifier or the client identifier is defined on the first encoding layer and the second encoding layer.

Example 15 includes the method as defined in example 8, where the media identifier includes a time stamp.

Example 16 includes a non-transitory computer readable medium comprising instructions, which when executed, cause a processor to at least encode a first bit sequence in a media file on a first encoding layer of a multilayered watermark, the first bit sequence to include a client identifier of a client associated with the media file, and encode a second bit sequence in the media file on a second encoding layer of the multilayered watermark, the second bit sequence to include a media identifier to identify media corresponding to the media file.

Example 17 includes the non-transitory computer readable medium as defined in example 16, wherein the instructions cause the processor to encode a time stamp on the second encoding layer.

Example 18 includes the non-transitory computer readable medium as defined in example 16, where the first bit sequence and the second bit sequence are encoded onto the first encoding layer and the second encoding layer, respectively, at periodic intervals.

Example 19 includes the non-transitory computer readable medium as defined in example 16, where the first and second bit sequences are encoded onto the first and second encoding layers, respectively, at a predetermined number of bits of the first encoding layer and the second encoding layer.

Example 20 includes the non-transitory computer readable medium as defined in example 16, where the instructions cause the processor to append the second bit sequence to the first bit sequence to identify the media corresponding to the media file.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
at least one processor; and
a non-transitory computer-readable medium having stored therein instructions that, upon execution by the at least one processor, cause the apparatus to:
decode a first bit sequence from a first encoding layer of a multilayered watermark encoded in a media file, the first bit sequence to include a client identifier of a client associated with the media file,
decode a second bit sequence from a second encoding layer of the multilayered watermark encoded in the media file, the second bit sequence to include a media identifier corresponding to the media file, and output an indication of at least one of the client identifier or the media identifier.

2. The apparatus as defined in claim 1, wherein the media file is at least a portion of a digital media stream.

3. The apparatus as defined in claim 1, wherein the first bit sequence is decoded from the first encoding layer based on a first group of frequency components of an audio portion of the media file, and the second bit sequence is decoded from the second encoding layer based on a second group of frequency components of the audio portion of the media file.

4. The apparatus as defined in claim 1, wherein the instructions, upon execution by the at least one processor, further cause the apparatus to decode a time stamp from at least one of the first encoding layer or the second encoding layer of the multilayered watermark.

5. The apparatus as defined in claim 1, wherein the instructions, upon execution by the at least one processor, further cause the apparatus to decode the first bit sequence and the second bit sequence in parallel, wherein the first bit sequence and the second bit sequence are encoded into respective segments of the media file that overlap in time.

6. The apparatus as defined in claim 1, wherein the media file includes an audio file, and the first encoding layer and the second encoding layer correspond to a first audio encoding layer and a second audio encoding layer, respectively, each of the first and second audio encoding layers corresponding, respectively, to first and second groups of frequency components, and at least some of the frequency components of the first group are different from the frequency components of the second group.

7. The apparatus as defined in claim 1, wherein the instructions, upon execution by the at least one processor, further cause the apparatus to append the second bit sequence to the first bit sequence.

8. The apparatus as defined in claim 1, wherein the instructions, upon execution by the at least one processor, further cause the apparatus to determine the client identifier and the media identifier based on the first bit sequence and the second bit sequence.

9. A method comprising:
   decoding, by executing instructions with at least one processor, a first bit sequence from a first encoding layer of a multilayered watermark encoded in a media file, the first bit sequence to include a client identifier of a client associated with the media file;
   decoding, by executing instructions with the at least one processor, a second bit sequence from a second encoding layer of the multilayered watermark encoded in the media file, the second bit sequence to include a media identifier to identify media corresponding to the media file; and
   outputting, by executing instructions with the at least one processor, an indication of at least one of the client identifier or the media identifier.

10. The method as defined in claim 9, further including determining a time stamp based on at least one of the first bit sequence or the second bit sequence.

11. The method as defined in claim 10, wherein the media file is at least a portion of a digital media stream.

12. The method as defined in claim 9, wherein the media file includes an audio file, and the first encoding layer and the second encoding layer corresponding to a first audio encoding layer and a second audio encoding layer, respectively, each of the first and second audio encoding layers corresponding, respectively, to first and second groups of frequency components, and at least some of the frequency components of the first group are different from the frequency components of the second group.

13. The method as defined in claim 9, further including appending the second bit sequence to the first bit sequence.

14. The method as defined in claim 9, wherein the first bit sequence and the second bit sequence are encoded into respective segments of the media file that overlap in time, and wherein the decoding the first bit sequence and the decoding the second bit sequence are carried out in parallel.

15. A non-transitory machine readable storage medium comprising instructions that, when executed, cause at least one processor to at least:
   decode a first bit sequence from a first encoding layer of a multilayered watermark encoded in a media file, the first bit sequence to include a client identifier of a client associated with the media file;
   decode a second bit sequence from a second encoding layer of the multilayered watermark encoded in the media file, the second bit sequence to include a media identifier corresponding to the media file; and
   output an indication of at least one of the client identifier or the media identifier.

16. The non-transitory machine readable storage medium as defined in claim 15, wherein the instructions cause the at least one processor to determine a time stamp based on at least one of the first bit sequence or the second bit sequence.

17. The non-transitory machine readable storage medium as defined in claim 16, wherein the media file is at least a portion of a digital media stream.

18. The non-transitory machine readable storage medium as defined in claim 15, wherein the media file includes an audio file, and the first encoding layer and the second encoding layer corresponding to a first audio encoding layer and a second audio encoding layer, respectively, each of the first and second audio encoding layers corresponding, respectively, to first and second groups of frequency components, and at least some of the frequency components of the first group are different from the frequency components of the second group.

19. The non-transitory machine readable storage medium as defined in claim 15, wherein the instructions cause the at least one processor to append the second bit sequence to the first bit sequence.

20. The non-transitory machine readable storage medium as defined in claim 15, wherein the first bit sequence and the second bit sequence are encoded into respective segments of the media file that overlap in time, and wherein the instructions cause the at least one processor to decode the first bit sequence and the second bit sequence in parallel.

* * * * *